UNITED STATES PATENT OFFICE.

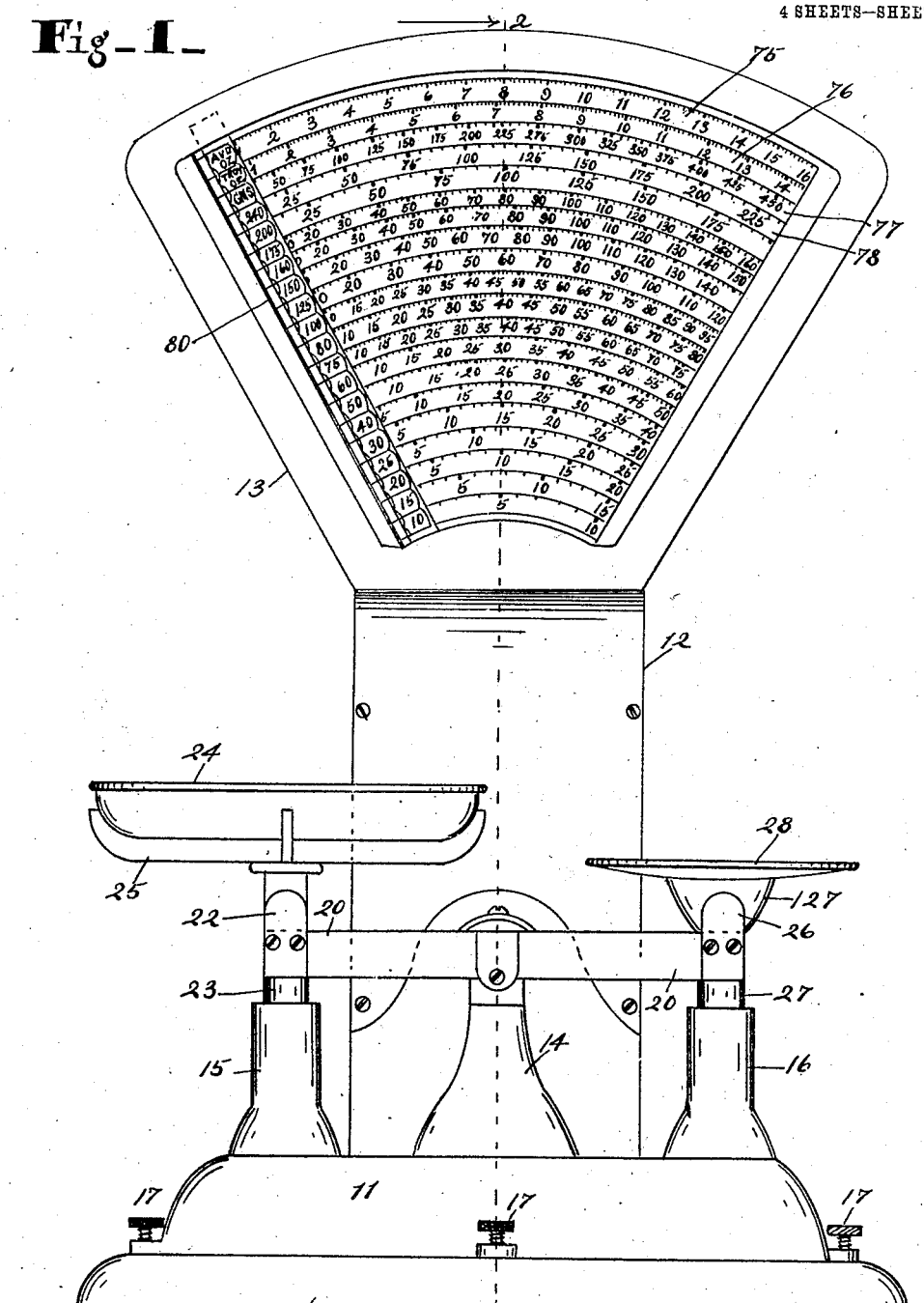

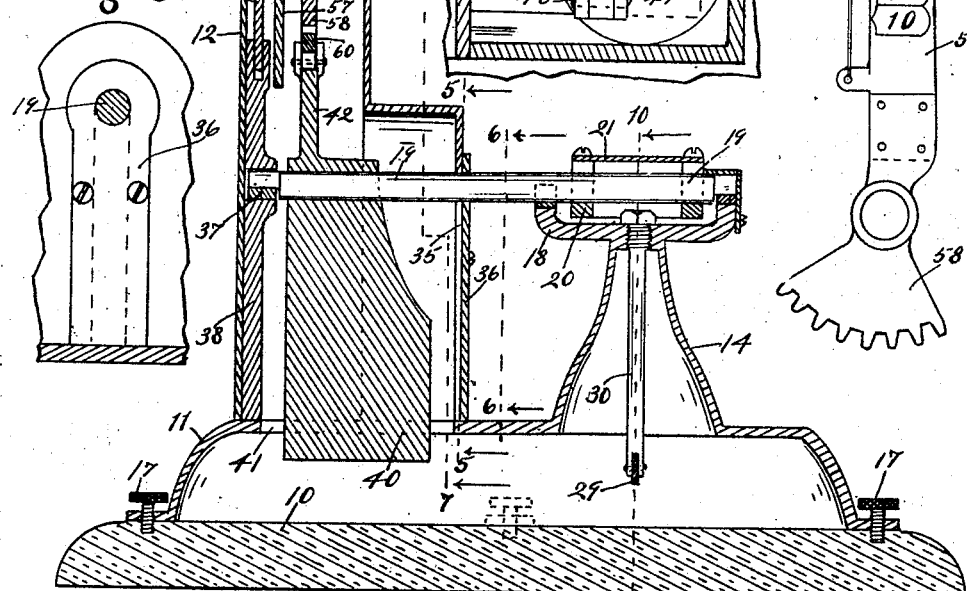

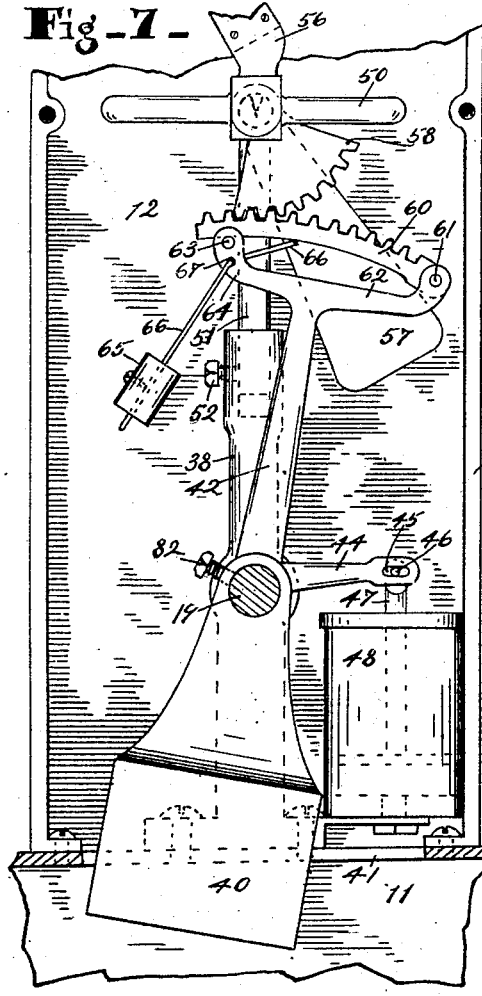
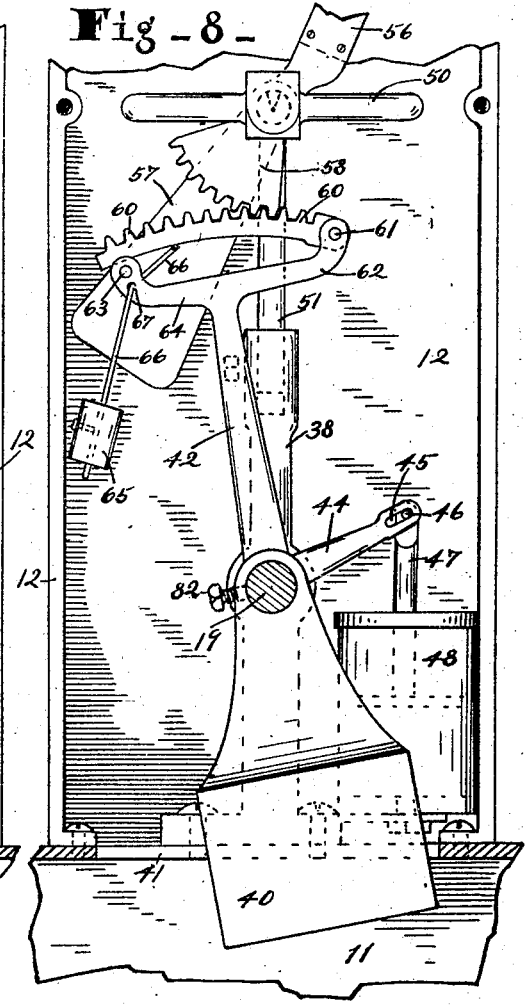
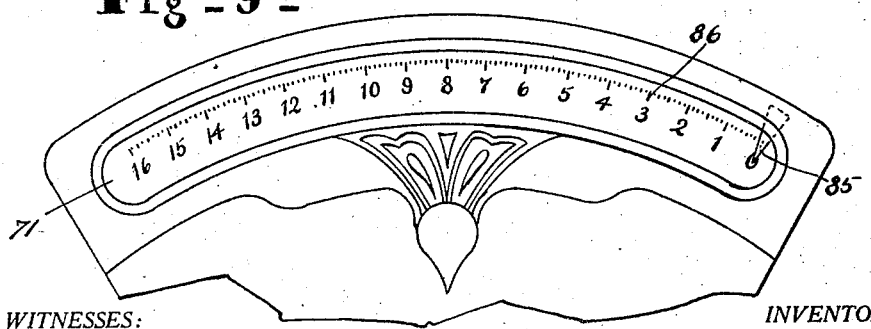

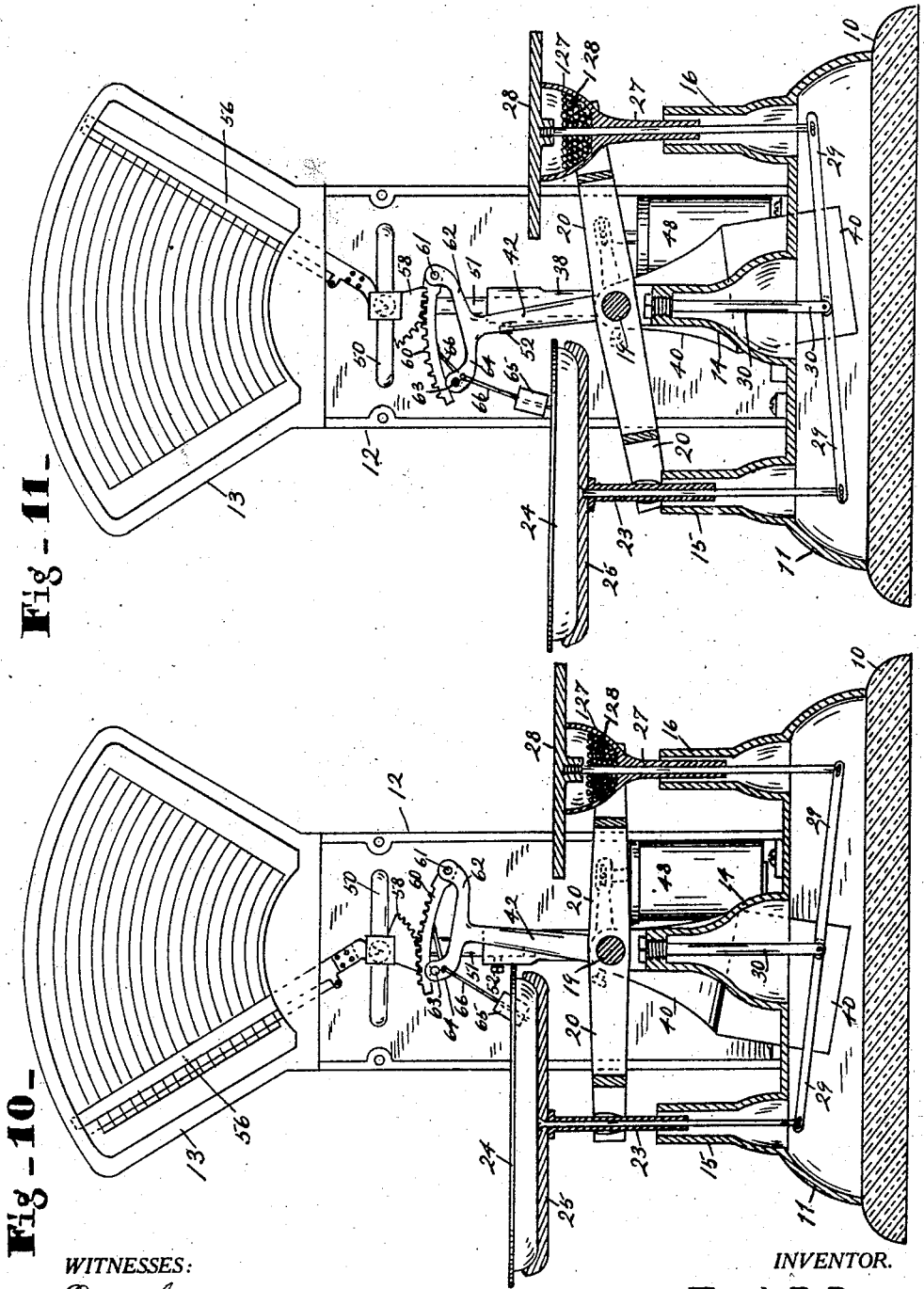

FRANK P. DUNN, OF ANDERSON, INDIANA, ASSIGNOR TO THE ANDERSON TOOL COMPANY, OF ANDERSON, INDIANA, A CORPORATION OF INDIANA.

SCALE.

1,017,656.      Specification of Letters Patent.     Patented Feb. 20, 1912.

Application filed November 13, 1908. Serial No. 462,390.

*To all whom it may concern:*

Be it known that I, FRANK P. DUNN, of Anderson, county of Madison, and State of Indiana, have invented a certain new and useful Scale; and I do hereby declare that the following is a full, clear, and exact description thereof, reference being had to the accompanying drawings, in which like letters refer to like parts.

The object of this invention is to provide a practical computing scale for use by druggists and the like. To that end I provide a weighing beam fulcrumed between its ends, preferably about midway thereof. And behind the central portion of said beam a chart and indicator is mounted, and also means actuated by the beam for operating the indicator.

Another feature of said invention consists in normally weighting one end of said beam so as to hold the load receiver at the other end of said beam in its elevated position and also the indicator at zero when there is no weight.

Along with the foregoing another feature of the invention is the provision of a horizontal shaft connected with said beam, preferably co-axial with the fulcrum thereof, and providing means whereby said shaft will actuate the indicator, and suspending from said shaft a pendulum weight. Along with the foregoing is the further idea of so arranging said pendulum weight that it will be in a truly vertical position when the indicator is about midway of the chart and when the indicator is at zero said pendulum weight will be maintained at one side of a vertical line through its fulcrum by the same weight that holds the load receiver elevated and the indicator at zero. Also, said pendulum weight always moves in the same direction as the indicator.

Another feature of the invention consists in the means for transmitting power from an arm on said horizontal shaft to the indicator. The latter is provided with a segmental gear with a series of teeth curved concentric with said shaft and pivotally mounted at one end but left free to be elevated at the other end, and a weight acting against said rack to hold it in engagement with the segmental gear on the indicator. This causes the rack to be always held in proper engagement with said segmental gear for the accurate actuation thereof and yet it avoids unusual friction between the rack and gear, the engagement of said parts being thereby maintained uniform.

The full nature of this invention will be understood from the accompanying drawings and the following description and claims.

In the drawings Figure 1 is a front elevation of the scale. Fig. 2 is a central vertical section therethrough on the line 2—2 of Fig. 1. Fig. 3 is a horizontal section on the line 3—3 of Fig. 2. Fig. 4 is an elevation of the indicator. Fig. 5 is a section on the line 5—5 of Fig. 2, parts being broken away. Fig. 6 is a section on the line 6—6 of Fig. 2, parts being broken away. Fig. 7 is a section on the line 7—7 of Fig. 2, on an enlarged scale, parts being broken away and the parts shown being in the zero position. Fig. 8 is the same showing the device actuated. Fig. 9 is a rear elevation of the upper part of the casing in which the chart is mounted, the lower part being broken away. Fig. 10 is a central vertical section through the device on the line 10—10 of Fig. 2, with the front plate of the casing removed and showing the parts in their unoperated condition. Fig. 11 is the same showing the parts in their operated position.

The machine shown herein for the purpose of illustrating the nature of this invention is provided with what may be called a foundation 10, a base 11, the lower portion of the casing 12 which is mounted on the rear part of the base 11 and the upper part of the casing 13 which is a continuation of the lower part 12 for the purpose of receiving the chart and indicator. On the front part of the base there is a central support, or stand 14 and at each side thereof corresponding stands 15 and 16. The base 11 may be leveled on the foundation 10 by the leveling screw 17.

On the support or stand 14 there are a pair of oppositely extending arms 18 in which the horizontal shaft 19 has bearings. The beam 20 is rigidly secured to said shaft 19 about midway its ends. A cover plate 21 is secured upon the two sides of the beam 20 to cover the shaft 19.

At the left hand end of the beam 20 a frame 22 is pivoted with the arm 23 projecting downwardly through the hollow stand 15. A load-receiving pan 24 rests upon a spider 25 that is secured upon the frame 22 and arm 23.

At the right hand end of the beam 20 there is a corresponding frame 26 pivoted with a corresponding arm 27 extending downwardly through the hollow stand 16. At the upper end 27 there is a bowl 127 adapted to contain shot or other adjustable weight 128 and having a central upwardly projecting bolt on which the weighted platform 28 is secured, upon which pound and ounce weights may be placed. A bar 29 extends from the rod 23 to the stationary rod 30 secured centrally in the hollow stand or post 14. The bar 29 is pivoted at each end to said parts and tends to hold the arm 23 substantially vertical during the oscillations of the beam 20. There is a similar bar like 29, connecting the rod 30 with the arm 27. The bars 29 are located in the base 10. This last part of the construction is in accordance with the usual make of druggists' scales.

The front wall of the lower part of the portion 12 of the casing has a vertical slot 35 through which the horizontal shaft 19 projects. This slot is closed by a removable plate 36. The inner end of the shaft 19 has a knife-edged bearing at 37 in the stationary vertically disposed bar 38 secured against the rear wall of the casing 12. It is immaterial as to the exact manner of securing the shaft 19 and the beam 20 together, so long as the construction is such that the oscillation of the beam 20 will cause the oscillation of the shaft 19. On the portion of said shaft 19 which projects into the casing there is secured a pendulum weight 40 that projects through and oscillates in the opening 41 in the top of the base 11. There is also an arm 42 that projects upwardly from the shaft 19 so as to be oscillated by said shaft. Herein the parts 40 and 42 are shown integral but that is not necessary so long as they are arranged so as to be actuated by the shaft 19. There is also an arm 44, see Fig. 7, projecting from the shaft 19. It is integral with the parts 40 and 42 herein but need not be so as long as the construction is such that it will be actuated by the shaft 19. There is a slot 45 in the outer end of the arm 44 through which a pin 46 projects and said pin is secured in the upper end of the plunger rod 47 of the dash-pot 48 that is secured within the casing, for the purpose of steadying the action of the parts of the scale, as is common in scales.

In the upper part of the portion 12 of the casing a horizontally disposed rectangular bearing bracket 50 is secured. As shown herein this bracket is so secured as to be vertically adjustable, as it is mounted on the upper end of the bar 51 that projects upwardly from the bar 38 and is adjustably mounted therein and held in adjusted position by the set screw 52. In said bearing bracket 50 there is a horizontal indicator shaft 55 on which the indicator 56 is secured so that it extends upwardly. The indicator is counter-balanced by the weight 57 and it is actuated by the pivoted segment 58 which projects in a direction opposite from the indicator 56 and is secured thereto. The toothed segment is fan-shaped and is actuated by a rack 60 that is curved concentrically with the shaft 19 and is pivoted at one end by the pin 61 to the lateral arm 62 on the upper end of the arm 42. The other end of the rack bar 60 is free to rest and ride upon the pin 63 that is mounted in the lateral arm 64 corresponding with the arm 62 and projecting oppositely therefrom. The rack bar 60 is held in working engagement with the segmental rack 58 by the weight 65 on the rod 66 that is fulcrumed at 67 in the arm 64 and one end of said bar bears against the under side of the rack bar 60 to hold it up against the segmental gear 58. This construction causes a nice working arrangement between the parts 58 and 60 that is comparatively free from friction and irregularity of operation. It avoids the very accurate workmanship that would be required if both ends of the rack bar 60 were stationary.

The upper portion 13 of the casing is fan-shaped and has a large fan-shaped front opening which is filled with a glass plate 70 and there is also in the upper portion thereof a rear opening curved concentric with the indicator shaft 55 and closed by a glass plate 71. Within said portion 13 of the casing a stationary fan-shaped chart 72 is secured. It is provided with a number of series of graduations and numerals curved concentric with the indicator shaft 55. The upper row of graduations and numerals 75 is arranged to indicate ounces of avoirdupois weight, the chart herein shown indicating sixteen ounces. Below said row of graduations and numerals 75 there is a parallel row 76 which indicates ounces according to troy weight. Below that there is a row 77 which indicates grams according to the metric system of weights. And below the foregoing there are series of graduations and numerals 78 indicating total values of articles according to certain prices per unit of weight, as indicated in the scales 75 and 76. These various rows of graduations and numerals are arranged so as to harmonize and enable a person using this scale to weigh as necessity may demand articles according to avoirdupois weight or the metric system and also indicating the values at certain prices per unit of weight.

The indicator 56, see Fig. 4, is provided with the usual hair-line 80 and with indications 175, 176 and 177 that register with the series of numerals and graduations 75, 76 and 77 to show what the latter series of graduations and numerals represent, namely, avoirdupois ounces, troy ounces and grams. The indicator has also marked on it numerals 178 indicating prices per unit and arranged to register with a series of graduations and numerals 78 on the chart. Thus the scale bar shows prices from 10¢ up to $2.40, as herein illustrated.

The adjustable mounting of the bearing bracket 50 is in order to bring the segmental rack 58 and the rack bar 60 into proper co-operating positions and also to cause the indications on the indicator 56 to correspond and register with the rows of numerals and graduations on the chart as shown in Fig. 1.

The upper end of the indicator 56 is curved over the upper edge of the chart 72 so as to form the end 85, see Fig. 2, and move across the series of graduations and indicating numerals 86 that is on the rear surface of the upper part of the chart and is visible through the glass plate 71. These graduations and numerals 86 correspond exactly with the weight graduations on the other side and are to indicate to any person standing behind the machine the avoirdupois weight of the article being weighed.

The arm 42 projects from the shaft 19 in a direction diametrically opposite from the center of the pendulum weight 40 and these two parts are held in adjusted position by a set screw 82 and are preferably arranged as shown, that is, so that they will be truly vertical when the indicator is midway of the chart. Therefore, when the indicator is at zero the weight 40 will be to the left of a vertical line through its fulcrum. This position is shown in Fig. 7. Therefore, when a load is applied the weight 40 yields and moves toward its center of gravity, the effect of the weight diminishing as it approaches the center of gravity and it reaches the center of gravity when the indicator is substantially midway of the chart or vertical. A further load causes the weight to swing to the right and its influence on the mechanism will gradually increase. Thus, it is noticeable that the pendulum weight 40 moves in the same direction as the indicator, instead of in the opposite direction, that is, when the weight moves to the left, the indicator moves to the left.

It is manifest that the precise details of construction may be varied without departing from the spirit of the invention and that features of the invention may be employed without its adoption as an entirety.

By "indicating means" in the claims hereof is meant the chart, the indicator, and immediate means for operating the same.

What I claim as my invention and desire to secure by Letters Patent is:

1. A scale including a beam, a shaft serving as the fulcrum of said beam, indicating means, an upwardly extending arm secured to said shaft, connecting means between said arm and the indicating means, whereby the indicating means is actuated and controlled by said arm, and a downwardly extending weight secured to the shaft so that it normally maintains the indicating means at zero.

2. A scale including a scale beam, a shaft co-axial with the fulcrum and secured to said beam and oscillated thereby, an indicating means, means actuated by the shaft for controlling the indicating means, a dash pot, an arm secured to said shaft for actuating the dash pot, and a weight secured to and suspended from said shaft in a direction opposite to the indicator actuating arm and at an angle to the dash-pot actuating arm.

3. A scale including a scale beam, a shaft co-axial with the fulcrum and secured to said beam and oscillated thereby, an indicating means, means actuated by the shaft for controlling the indicating means, a dash pot, a weight secured to and suspended from said shaft in a direction opposite to the indicator actuating arm and at an angle to the dashpot actuating arm, the relative positions of said indicator actuating arm and dash pot actuating arm being fixed.

4. A scale including a beam fulcrumed between its ends, a shaft coaxial with the fulcrum and oscillated by said beam, a weight secured to and suspended from said shaft, a load-receiving member mounted on one end of said beam, and weighted means on the other end of said beam sufficient to counterbalance said load-receiving member and hold said pendulum weight to one side of a vertical line through its axis.

5. A scale including a beam fulcrumed between its ends, an indicator, oscillatory means connecting with and actuated by said beam for operating the indicator, a pendulum weight secured to and suspended from said indicator actuating means, a load-receiving member on one end of said beam, and weighted means on the other end of said beam sufficient to counterbalance the load-receiving member and maintain the indicator at zero and said pendulum weight to one side of a vertical line through its axis.

6. A scale including an indicator, a segmental rack for oscillating the same, a rocking arm, a rack bar pivoted at one end and free at the other end for engaging said segmental rack, a lever fulcrumed between its ends with one end bearing against said rack bar to hold it in engagement, a weight on the other end of said lever, and load-influenced means for rocking said arm.

7. A scale including an oscillatory indicator, vertically adjustable means for oscillating the same, a transversely extending segmental rack for operating the indicator, a rocking vertically disposed arm, and a rack bar carried by said arm that engages said segmental rack for actuating it.

8. A scale including an indicating means, a horizontally disposed beam fulcrumed between its ends, a load receiving member pivotally mounted upon one end of said beam, a counterbalancing weight receiving member pivotally mounted upon the other end of said beam, an upwardly extending arm connected with said beam that operates the indicating means, and a downwardly extending weight connected with said arm and said beam and arranged normally to maintain the indicating means at zero and the weight receiving member in its elevated position.

In witness whereof, I have hereunto affixed my signature in the presence of the witnesses herein named.

FRANK P. DUNN.

Witnesses:
 GRACE M. COSTELLO,
 BENJAMIN D. MONNEL.